(12) United States Patent
Wang et al.

(10) Patent No.: US 12,115,731 B2
(45) Date of Patent: Oct. 15, 2024

(54) PRIMARY-SECONDARY TYPE DISEASE DETECTION AND REPAIR SYSTEM AND METHOD FOR INFRASTRUCTURE

(71) Applicant: SHANDONG UNIVERSITY, Shandong (CN)

(72) Inventors: Jing Wang, Shandong (CN); Zhengfang Wang, Shandong (CN); Peng Jiang, Shandong (CN); Kefu Chen, Shandong (CN); Yanfei Yu, Shandong (CN); Wei Guo, Shandong (CN); Qingmei Sui, Shandong (CN)

(73) Assignee: SHANDONG UNIVERSITY, Shandong (CN)

( * ) Notice: Subject to any disclaimer, the term of this patent is extended or adjusted under 35 U.S.C. 154(b) by 331 days.

(21) Appl. No.: 17/779,550

(22) PCT Filed: Nov. 6, 2020

(86) PCT No.: PCT/CN2020/127195
§ 371 (c)(1),
(2) Date: Jul. 18, 2022

(87) PCT Pub. No.: WO2022/067966
PCT Pub. Date: Apr. 7, 2022

(65) Prior Publication Data
US 2023/0011911 A1    Jan. 12, 2023

(30) Foreign Application Priority Data
Sep. 30, 2020 (CN) .......................... 202011061848.7

(51) Int. Cl.
*B29C 64/393* (2017.01)
*B25J 9/16* (2006.01)
(Continued)

(52) U.S. Cl.
CPC ........... *B29C 64/393* (2017.08); *B25J 9/1694* (2013.01); *B25J 11/005* (2013.01); *B29C 64/236* (2017.08);
(Continued)

(58) Field of Classification Search
CPC ..... B29C 64/393; B29C 64/236; B29C 73/02; B29C 73/24; B29C 64/106; B29C 64/209;
(Continued)

(56) References Cited

U.S. PATENT DOCUMENTS 10,253,462 B1 * 4/2019 Raman ...................... B66F 7/00
11,555,912 B2 * 1/2023 Liu ....................... G05D 1/0246
(Continued)

FOREIGN PATENT DOCUMENTS

CN      2598711      1/2004
CN      202001024    10/2011
(Continued)

OTHER PUBLICATIONS

"International Search Report (Form PCT/ISA/210) of PCT/CN2020/127195", mailed on Jun. 24, 2021, with English translation thereof, pp. 1-8.
(Continued)

*Primary Examiner* — Jaime Figueroa
*Assistant Examiner* — Sihar A Karwan
(74) *Attorney, Agent, or Firm* — JCIPRNET

(57) ABSTRACT

A surface disease repair system and method for an infrastructure based on climbing robots are provided. The system includes a detection and marking climbing robot and a repair climbing robot. In the process of moving on a surface of an infrastructure to be detected, the detection and marking climbing robot collects a front surface image in real time through a binocular camera arranged at a front end, detects a disease on the basis of the front surface image, and
(Continued)

performs localization and map reconstruction at the same time; when a disease is detected, the position of the disease is recorded, and a marking device is controlled to mark the disease; after detection and marking are completed, the position of the disease and the map are sent to the repair climbing robot; and the repair climbing robot receives the map and the position of the disease, reaches the position of the disease, and repairs the disease according to the mark by using a repair device.

10 Claims, 3 Drawing Sheets

(51) Int. Cl.
    *B25J 11/00*     (2006.01)
    *B29C 64/236*     (2017.01)
    *B29C 73/02*     (2006.01)
    *B29C 73/24*     (2006.01)
    *B33Y 30/00*     (2015.01)
    *B33Y 50/02*     (2015.01)
    *G01S 17/89*     (2020.01)

(52) U.S. Cl.
    CPC .............. *B29C 73/02* (2013.01); *B29C 73/24* (2013.01); *B33Y 30/00* (2014.12); *B33Y 50/02* (2014.12); *G01S 17/89* (2013.01)

(58) Field of Classification Search
    CPC ........ B25J 9/1694; B25J 11/005; B25J 5/005; B33Y 30/00; B33Y 50/02; G01S 17/89; G01S 7/4808; G01S 17/86; G01S 17/42; E02D 37/00; E02D 15/02; E01D 19/106; E01D 22/00; E02B 7/00
See application file for complete search history.

(56) References Cited

U.S. PATENT DOCUMENTS

| | | | | |
|---|---|---|---|---|
| 2013/0034660 A1* | 2/2013 | Koyanagi | ........... | B05B 13/0452 118/620 |
| 2014/0031977 A1* | 1/2014 | Goldenberg | ........... | B62D 55/26 180/9.1 |
| 2015/0273696 A1* | 10/2015 | Nam | ...................... | B25J 19/023 901/44 |
| 2017/0057081 A1* | 3/2017 | Krohne | ................. | B64C 39/024 |
| 2020/0142052 A1* | 5/2020 | Liu | ...................... | G01S 13/865 |
| 2022/0276383 A1* | 9/2022 | Li | .............................. | G06T 7/13 |

FOREIGN PATENT DOCUMENTS

| | | | | |
|---|---|---|---|---|
| CN | 103253314 | | 8/2013 | |
| CN | 104527495 | | 4/2015 | |
| CN | 104888388 | | 9/2015 | |
| CN | 106290380 | | 1/2017 | |
| CN | 106654987 | | 5/2017 | |
| CN | 106869001 | | 6/2017 | |
| CN | 107310649 | | 11/2017 | |
| CN | 107675898 | | 2/2018 | |
| CN | 107675898 | A * | 2/2018 | |
| CN | 107842211 | | 3/2018 | |
| CN | 108106801 | | 6/2018 | |
| CN | 108316117 | | 7/2018 | |
| CN | 108731736 | | 11/2018 | |
| CN | 109374043 | | 2/2019 | |
| CN | 109737314 | | 5/2019 | |
| CN | 109923264 | | 6/2019 | |
| CN | 110328676 | | 10/2019 | |
| CN | 210163775 | | 3/2020 | |
| CN | 111645833 | | 9/2020 | |
| CN | 111645833 | A * | 9/2020 | |
| CN | 112342908 | | 2/2021 | |
| JP | 2008120252 | | 5/2008 | |
| JP | 2008120252 | A * | 5/2008 | |

OTHER PUBLICATIONS

"Written Opinion of the International Searching Authority (Form PCT/ISA/237) of PCT/CN2020/127195", mailed on Jun. 24, 2021, with English translation thereof, pp. 1-10.

"Office Action of China Counterpart Application", issued on Jun. 1, 2021, with English translation thereof, p. 1-p. 23.

* cited by examiner

PRIMARY-SECONDARY TYPE DISEASE DETECTION AND REPAIR SYSTEM AND METHOD FOR INFRASTRUCTURE

CROSS-REFERENCE TO RELATED APPLICATION

This application is a 371 of international application of PCT application serial no. PCT/CN2020/127195, filed on Nov. 6, 2020, which claims the priority benefit of China application no. 202011061848.7, filed on Sep. 30, 2020. The entirety of each of the above mentioned patent applications is hereby incorporated by reference herein and made a part of this specification.

BACKGROUND OF THE INVENTION

Technical Field

The present invention belongs to the technical field of detection and repair of large infrastructure structures, and particularly relates to a primary-secondary type disease detection and repair system and method for an infrastructure.

Background Technology

The description in this section merely provides background information related to the present disclosure and does not necessarily constitute the prior art.

A large number of large infrastructures such as dams, bridges, and underground projects such as tunnels (holes) and pipe racks have been constructed and put into operation. Many structural diseases, such as cracks, shedding and water leakage, easily occur in these infrastructure project structures during their long-term service, leading to a decrease in the service lives of the large infrastructures and a threat to the safety of people's lives and properties. A traditional regular detection and repair technology relies on people, which is time-consuming and labor-intensive, and the automation level is low. In order to improve the automation level, it is particularly important to develop a detection and repair robot technology for structural diseases of large infrastructures.

Existing infrastructure detection is mainly based on a detection robot. A mainstream method is to detect surface diseases based on a guide rail-type detection robot equipped with an image sensor, such as: a guide rail-type bridge detection robot with patent number of [CN210163775U]. In this patent, a guide rail is used to enable the robot to move on a bridge, and a camera tripod head is used to detect bridge conditions. In this technology, robot guide rails need to be installed, and it is difficult to detect internal diseases of the structure. At the same time, it is difficult to automatically repair the detected surface diseases. There is also a method using a rotor wing system to generate a reverse thrust to realize the attachment of a robot to a wall surface and to detect internal diseases of an infrastructure, such as: an automatic climbing radar photoelectric robot system for non-destructive detection and diagnosis of diseases of a bridge and tunnel structure with patent number of [CN108731736A]. In this patent, the reverse thrust of a rotor wing system is used to enable a robot equipped with a laser radar to be clung to a surface of a bridge and tunnel structure to detect the diseases of the bridge and tunnel structure. Due to a limited reverse thrust, this technology has a requirement for the quality of the equipped detection equipment.

At present, to repair diseases of an infrastructure, a large vehicle equipped with a repair device is mainly used to repair a large infrastructure structure, such as: a rapid tunnel disease repair engineering vehicle with patent number of [CN202001024U]. In this patent, the repair engineering vehicle is used to perform various repair work on diseases of an infrastructure. This method relies on manual control, and the infrastructure needs to be blocked during construction, which consumes a lot of human and material resources. In recent years, there has been a repair measure for an infrastructure structure based on a remote control robot, such as: an unmanned aerial vehicle for repairing wall cracks based on internet of things with patent number of [CN107842211A]. In this patent, a remote control unmanned aerial vehicle is used to repair wall cracks. This equipment requires human assistance and cannot achieve integration of detection and repair.

SUMMARY OF THE INVENTION

In order to overcome the shortcomings in the above prior art, the present invention provides a primary-secondary type disease detection and repair system and method for an infrastructure, which can detect and repair a disease without affecting the use of a large infrastructure.

In order to achieve the foregoing objective, one or more embodiments of the present invention provide the following technical solutions.

A primary-secondary type disease detection and repair system for an infrastructure includes a mobile robot; two climbing robot fixing devices are arranged on the mobile robot; and the two climbing robot fixing devices are respectively used to place a detection climbing robot and a repair climbing robot; and the mobile robot is configured to detect a surface disease of an infrastructure, control the detection climbing robot to detect an internal disease of the infrastructure, and record positions of the surface disease and the internal disease; and after the detection is completed, control the repair climbing robot to perform repair according to the positions of the diseases.

Further, the mobile robot includes a control processing module, a three-dimensional laser scanner, a line scanning camera array, a display screen and a grabbing device; and the three-dimensional laser scanner, the line scanning camera array, the grabbing device, the display screen, and control modules of the detection climbing robot and the repair climbing robot are all in communication connection with the control processing module.

One or more embodiments provide a detection and repair method based on the primary-secondary type disease detection and repair system for an infrastructure. The method includes:

(1) detecting, by the mobile robot, a surface disease of an infrastructure:
   acquiring three-dimensional point cloud data of a surrounding environment collected by the three-dimensional laser scanner to construct a global map; and
   acquiring surface image data collected by the line scanning camera array to detect a surface disease structure, and locating detected surface disease structure information in the global map;

(2) controlling the detection climbing robot to detect an internal disease of the infrastructure:
   controlling the grabbing device to grab the detection climbing robot and place the same on a surface of the infrastructure;

receiving laser radar data transmitted by the detection climbing robot, planning a path by using a pheromone-based path planning method, controlling the detection climbing robot to detect an internal disease according to the path, and locating detected surface disease structure information in the global map; and after the detection of the internal disease is completed, controlling the detection climbing robot to return, and controlling the grabbing device to grab the detection climbing robot and place the same back onto the mobile robot; and (3) controlling the repair climbing robot to repair the disease:

controlling the grabbing device to grab the repair climbing robot and place the same on the surface of the infrastructure;

planning a repair path on the basis of a D*Lite path planning algorithm according to the position of the disease, and controlling the repair climbing robot to repair the disease according to the path; and after the repair of the disease is completed, controlling the repair climbing robot to return, and controlling the grabbing device to grab the repair climbing robot and place the same back onto the mobile robot.

One or more technical solutions described above have the following beneficial effects:

The two climbing robots and the mobile robot form a "primary-secondary type" disease detection and repair system for an infrastructure. First, the mobile robot detects a surface disease, and then the detection climbing robot and the repair climbing robot are controlled in sequence to perform internal disease detection and disease repair, thus achieving integration of detection and repair.

The detection and repair system has high integration degree and thus has high flexibility, and it can perform repair work without affecting the use of the large infrastructure.

The detection climbing robot detects the internal disease by using the pheromone-based path planning method, and pheromone values of a raster map are adjusted according to a disease detection result, so that the detection is faster and will not miss any part.

The repair climbing robot repairs the disease on the basis of structural light scanning+3D fluid printing, so that the quickness and accuracy of the repair work are improved.

BRIEF DESCRIPTION OF THE SEVERAL VIEWS OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation on the present invention.

Figure 1:
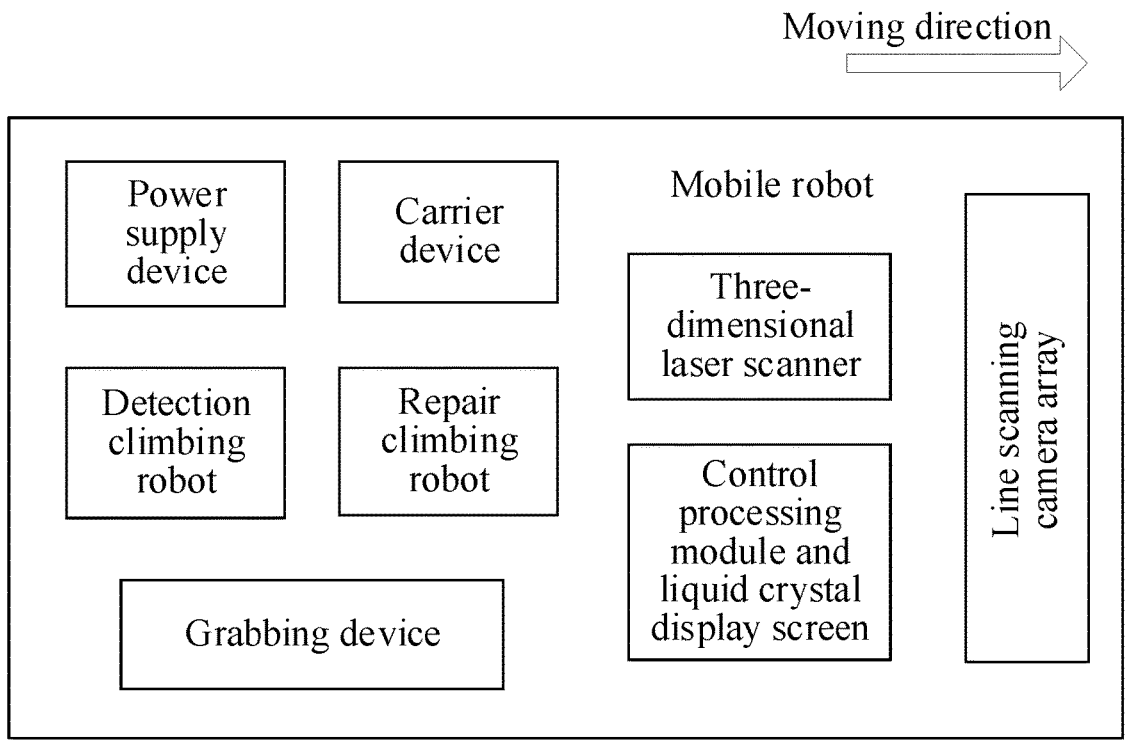
FIG. 1 is an overall block diagram of a detection and repair system in an embodiment of the present invention.
Figure 2:
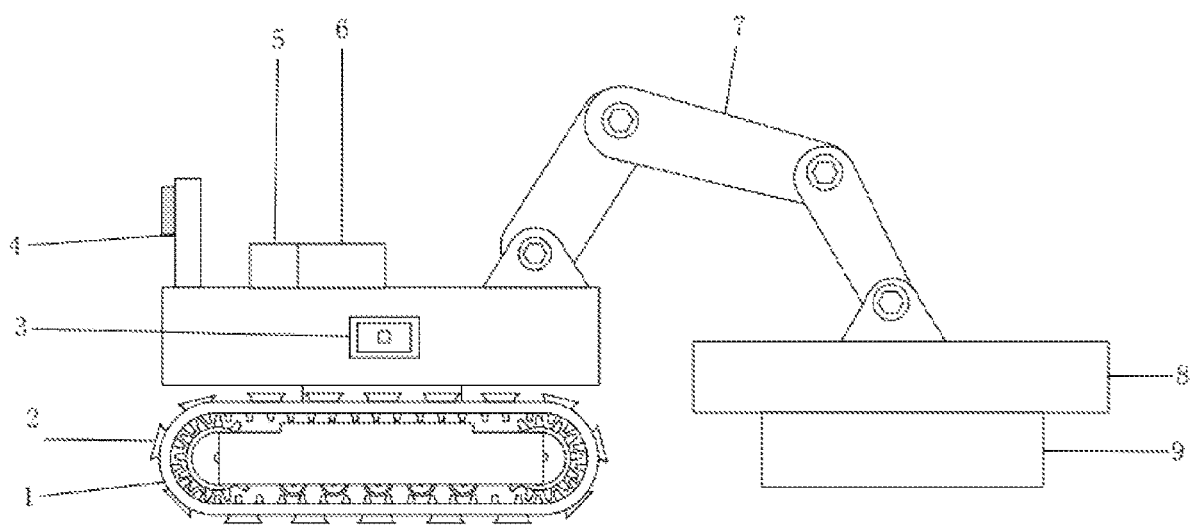
FIG. 2 is a schematic diagram of a detection climbing robot in an embodiment of the present invention.
Figure 3:
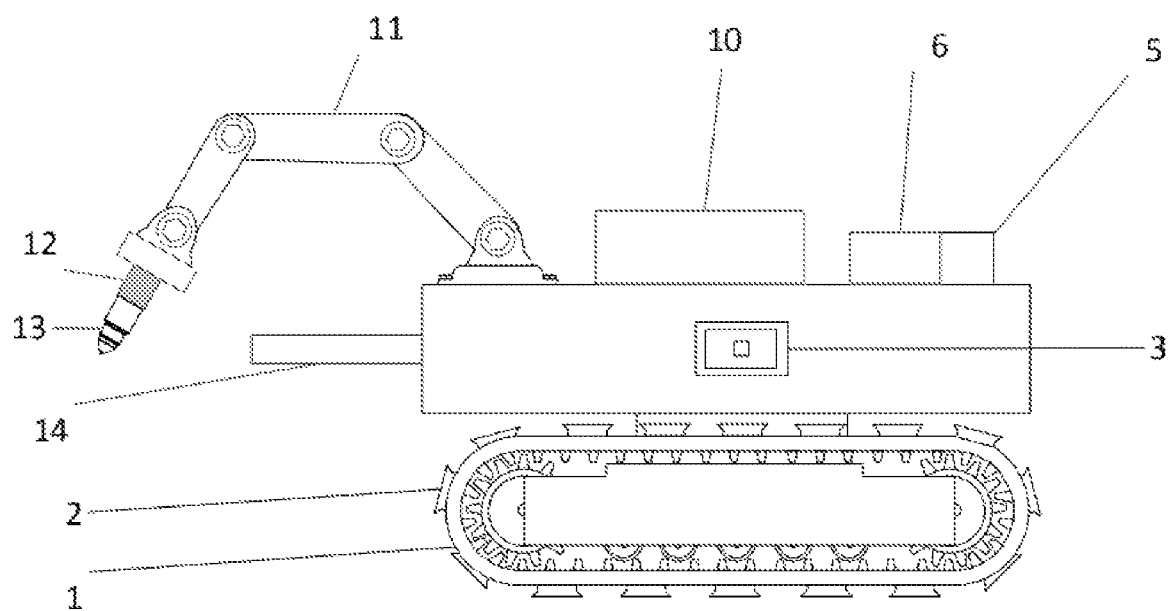
FIG. 3 is a schematic diagram of a repair climbing robot in an embodiment of the present invention.
Figure 4:
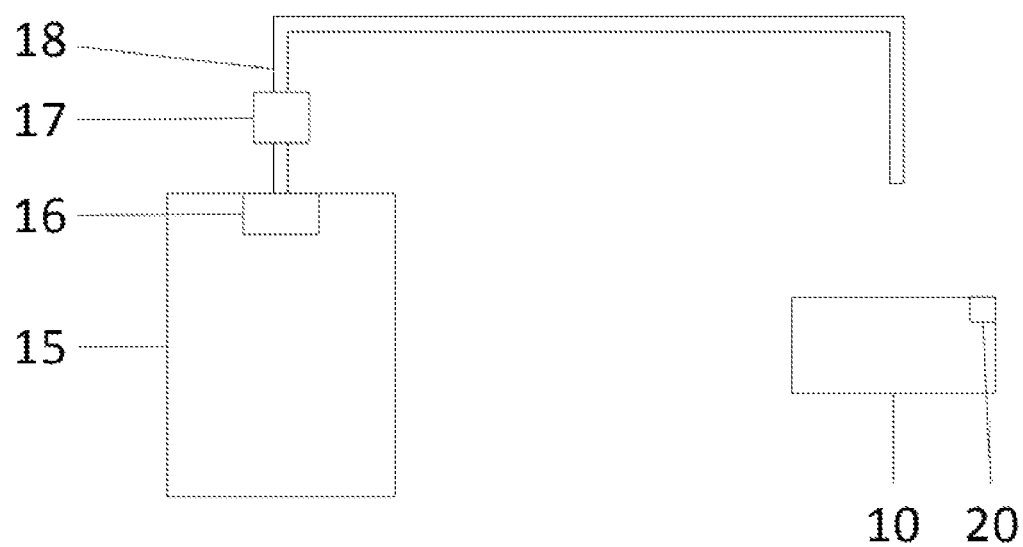
FIG. 4 is a schematic diagram of supplementation and connection of a repair climbing robot in an embodiment of the present invention.
Figure 5:
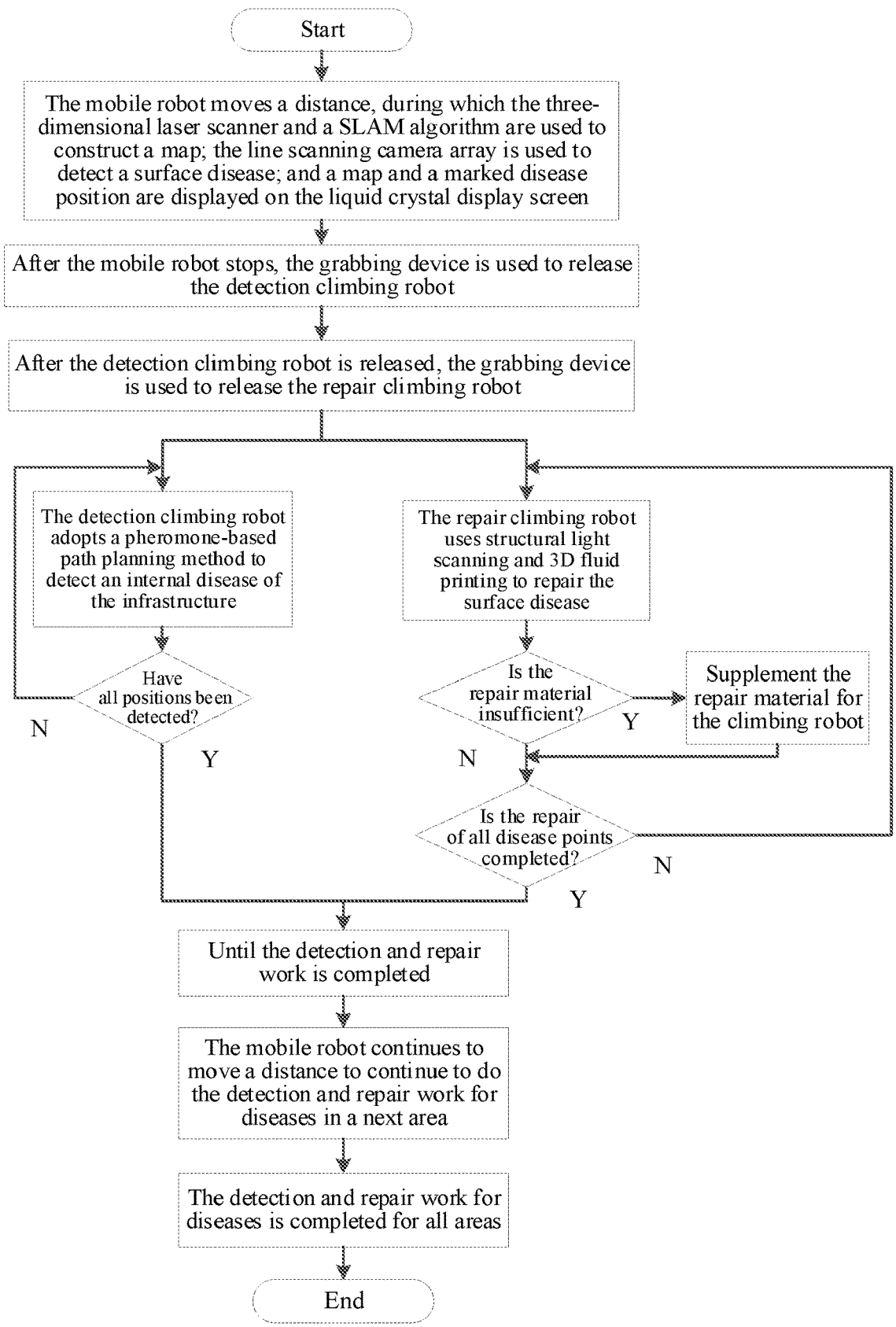
FIG. 5 is a work flow chart in an embodiment of the present invention.

1: caterpillar band; 2: suction disk accessory; 3: cable interface; 4: camera platform; 5: vacuum pump; 6: climbing robot control module; 7: mechanical arm; 8: carrying platform; 9: carrying equipment; 10: material storage box; 11: 3-degree-of-freedom mechanical arm; 12: RD-EC metering pump; 13: metal nozzle; 14: structural light module; 15: carrier device shell; 16: centrifugal pump; 17: flow meter; 18: conveying pipe; and 19: liquid level sensor.

DETAILED DESCRIPTION

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Terms used herein are only for describing specific implementations and are not intended to limit exemplary implementations according to this application. As used herein, the singular form is intended to include the plural form, unless the context clearly indicates otherwise. Orientation or positional relationships indicated by terms such as "upper", "lower", "left", "right", "front", "rear", "vertical", "horizontal", "side", "bottom" and the like are orientation or positional relationships shown in the drawings, merely relational words determined for ease of recitation of structural relationships of various components or elements of the present invention, are not specific to any component or element of the present invention, and are not to be construed as a limitation on the present invention. In this application, terms such as "fixedly connected", "interconnection", and "connection" should be understood in a broad sense. The connection may be a fixing connection, an integral connection or a detachable connection; or the connection may be a direct connection, or an indirect connection by using an intermediary. Relevant scientific research or technical personnel in the art may determine the specific meanings of the foregoing terms in the present invention according to specific situations, and such terms should not be construed as a limitation on the present invention.

The embodiments in the present invention and features in the embodiments can be mutually combined in the case of no conflict.

Embodiment 1

This embodiment discloses a "primary-secondary type" disease detection and repair system for an infrastructure based on climbing robots and a mobile robot. The detection and repair system includes a mobile robot. A control processing module, a three-dimensional laser scanner, a line scanning camera array, a liquid crystal display screen, a grabbing device, a carrier device, a power supply device and two climbing robot fixing devices; and the two climbing robots fixing devices are respectively used to place a detection climbing robot and a repair climbing robot. The three-dimensional laser scanner, the line scanning camera array, the grabbing device, the liquid crystal display screen, the carrier device, the detection climbing robot and the repair climbing robot are all in communication connection with the control processing module.

The control processing module is configured to receive point cloud data of a surrounding environment acquired by the three-dimensional laser scanner to construct a global map; receive surface image data acquired by the line scanning camera array to detect a surface structural disease and mark detected surface structural disease information in the map; and control the grabbing device to grab the detection climbing robot and place the same on a surface of an infrastructure, control the detection climb robot to detect an internal disease, receive internal disease information detected by the detection climbing robot, and mark the information in the map; control the grabbing device to grab the repair climbing robot and place the same on the surface of the infrastructure, and control the repair climbing robot to repair the disease according to the marked disease position in the map.

The above two climbing robots and the mobile robot form a "primary-secondary type" disease detection and repair system for an infrastructure, which can achieve comprehensive detection for surface and internal diseases and disease repair. Furthermore, this detection and repair system has strong integration and thus has high flexibility, and it can perform repair work without affecting the use of a large infrastructure.

Mobile Robot

The mobile robot is a heavy-load AGV platform. As shown in FIG. 1, a three-dimensional laser scanner, a line scanning camera array, a control processing module, a liquid crystal display screen, a carrier device, a power supply device, a grabbing device and two climbing robot fixing devices are arranged on the mobile robot. The three-dimensional laser scanner is arranged in the middle of a platform of the mobile robot; the line scanning camera array is arranged at a front end of the mobile robot; the control processing module and the liquid crystal display screen are arranged beside the three-dimensional laser scanner on the platform of the mobile robot; the carrier device and the power supply device are both arranged on one side of the mobile robot; the grabbing device is arranged on the other side of the mobile robot; and the two climbing robot fixing devices are arranged at a rear end of the three-dimensional laser scanner on the platform of the mobile robot. Furthermore, the three-dimensional laser scanner, the line scanning camera array, the liquid crystal display screen, the carrier device, the grabbing device and climbing robots placed in the two climbing robot fixing devices are all connected to the control processing module; and the power supply device is used for supplying power to all the modules of the mobile robot and is connected to a detection climbing robot and a repair climbing robot through cables. Positions of the detection climbing robot and the repair climbing robot on the mobile robot are their initial positions.

Specifically, the three-dimensional laser scanner is used to acquire point cloud data of a surrounding environment.

Every two units in the line scanning camera array form a binocular camera used to acquire surface image data of a large infrastructure.

The control processing module is used to receive data information acquired by the three-dimensional laser scanner and the line scanning camera array and process the data information. A wireless communication module sends a control signal to the mobile robot and the climbing robots and acquires position information of the detection climbing robot and the repair climbing robot in real time.

The wireless communication module is used to establish communication connection between the control processing module and the detection climbing robot as well as the repair climbing robot.

The liquid crystal display screen is used to display the constructed global map, positions of the climbing robots, position structure information of a surface disease, position information of an internal disease and an inversion model.

The power supply device adopts a high-capacity battery, and supplies power to the climbing robots in real time when the climbing robots are fixed on the climbing robot fixing devices.

The carrier device adopts a centrifugal pump and a flow meter, and conveys a repair material to a material storage box of the repair climbing robot through a conveying pipe. When the repair climbing robot is at the initial position, the conveying pipe of the carrier device can be abutted with the material storage box of the repair climbing robot. During execution of supplementation, the material storage box of the repair climbing robot is controlled to be opened;

the centrifugal pump in the carrier device starts to work to convey the repair material in the carrier device into the material storage box through the conveying pipe, during which, the flow meter of the carrier device and a liquid level sensor in the material storage box monitor the transportation of the repair material; when the total volume of the repair material or a liquid level in the material storage box reaches a requirement, the centrifugal pump stops working and then controls the material storage box to be closed; and the supplementation for the repair climbing robot is completed.

The grabbing device adopts a mechanical arm and a manipulator structure, and is used to clamp the detection climbing robot and the repair climbing robot from the mobile robot to a surface of a large infrastructure.

Detection Climbing Robot

The detection climbing robot includes a climbing robot main body and a movement device located below the main body. The movement device includes a caterpillar band type negative pressure suction disk and a vacuum pump which are located on two sides below the main body. The structure of the climbing robot main body adopting the caterpillar band type negative pressure suction disk structure is the prior art, and descriptions thereof are omitted here. A cable interface and a control module are arranged on the climbing robot main body, and a camera platform, a mechanical arm, detection equipment and a wireless communication module which are connected to the control module are also arranged on the climbing robot main body. The camera platform is located at a front end of the main body; the mechanical arm is arranged at a rear end of the main body; and a tail end of the mechanical arm is connected to the detection equipment through a carrying platform.

Specifically, the camera platform includes a binocular camera and a depth camera, and is used to acquire surface image data in the front.

The detection equipment is a laser radar used to detect an internal disease of the large infrastructure.

The mechanical arm is a 3-degree-of-freedom mechanical arm used to place the detection equipment on a surface of the infrastructure.

The cable interface is used to be connected to the power supply equipment through a cable when the detection climbing robot is fixed on the mobile robot.

The wireless communication module is used to establish a communication connection between the control module and the control processing module of the mobile robot.

The control module is configured to receive data collected by the laser radar, transmit the data to the control processing module of the mobile robot and receive a path control instruction sent by the mobile robot.

Repair Climbing Robot

The repair climbing robot includes a climbing robot main body and a movement device located below the main body. The movement device includes a caterpillar band type negative pressure suction disk and a vacuum pump which are located on two sides below the main body. The structure of the climbing robot main body adopting the caterpillar band type negative pressure suction disk structure is the prior art, and descriptions thereof are omitted here. A cable interface, a material storage box and a control module are arranged on the repair climbing robot main body, and a mechanical arm, a structural light module, a fluid printing module and a wireless communication module which are connected to the control module are also arranged on the repair climbing robot main body. The mechanical arm is arranged at a front end of the main body; a tail end of the mechanical arm is connected to the fluid printing module; the structural light module is arranged at the front end of the main body and below the mechanical arm; and the material storage box is arranged in the upper middle part of the main body. A switch for controlling opening and closing and a liquid level sensor are also arranged in the material storage box and are both connected to the control module.

Specifically, the structural light module includes a light source, a CCD camera and a processor. The light source is used to obtain and emit encoded laser stripes. The CCD camera is used to receive reflected light. The processor demodulates a three-dimensional structure of a disease from the reflected light and sends the three-dimensional structure to the control module.

The fluid printing module includes an RD-EC metering pump and a metal nozzle. The RD-EC metering pump is mounted between the metal nozzle and the 3-degree-of-freedom mechanical arm to control a flow rate of a printing material to achieve accurate printing.

The material storage box is used to store a repair material, and the switch for controlling opening and closing and the liquid level sensor are arranged in the material storage box. When the repair climbing robot is at the initial position on the mobile robot, the repair climbing robot and the carrier device have been aligned, that is, the material storage box of the repair climbing robot can be abutted with the conveying pipe of the carrier device.

The mechanical arm is a 3-degree-of-freedom mechanical arm used to place the detection equipment on a surface of the infrastructure.

The cable interface is used to be connected to the power supply equipment through a cable when the detection climbing robot is fixed on the mobile robot.

The wireless communication module is used to establish a communication connection between the control module and the control processing module of the mobile robot.

The control module is configured to receive path information sent by the mobile robot and repair a disease according to the path. Specifically, the repair climbing robot repairs a disease according to the following steps every time it reaches a disease point:

(1) A three-dimensional structure model of a disease is reconstructed on the basis of the structural light module.

Specifically, systematic geometric parameters of the structural light module and internal parameters of the CCD camera and the like are calibrated; the light source is programmed by a four-step phase shift method to produce four kinds of laser stripes with a phase difference; the four kinds of stripes are respectively projected to a surface of the disease; the CCD camera is used to take pictures of the modulated bent stripes and demodulate truncated phase information; and the processor recovers a truncated phase into a modulated continuous phase, seeks the difference between the modulated continuous phase and the reference continuous phase subtraction, and substitutes a differential phase into a phase and height conversion formula, thus obtaining a three-dimensional structure model of the disease.

(2) The mechanical arm is controlled to move, so that the nozzle at the tail end of the mechanical arm reaches the disease point.

Specifically, after three-dimensional structure information of the disease is obtained, the structural light module retracts, and the 3-degree-of-freedom mechanical arm can describe a 3-degree-of-freedom operation space according to a D-H method. For each position in the operation space, angle information of each corresponding joint can be calculated by using matrix transformation, so that the metal nozzle at a top end of the mechanical arm can reach this point.

(3) For the three-dimensional structure model of the disease, the metal nozzle is moved to the surface of the disease according to this method; and a "Fluid Dosing and Deposition" (FDD) technology is adopted to perform 3D fluid printing work, during which, the RD-EC metering pump extracts the repair material and controls its flow rate, thus achieving accuracy repair of the disease.

During work of the repair climbing robot, the control module receives in real time the usage of the repair material of the repair climbing robot counted by the RD-EC metering pump of the 3D fluid printing module and determines whether the material is sufficient. When it is detected that the repair material in the material storage box is insufficient, the repair climbing robot is controlled to return to a certain fixed point on the surface of the infrastructure, and a supplementation instruction is sent to the control processing module of the mobile robot. After receiving the supplementation instruction, the mobile robot controls the grabbing device to grab the climbing robot to the initial position for supplementation. At the initial position, the repair climbing robot and the carrier device have been aligned; the material storage box of the repair climbing robot can be abutted with the conveying pipe of the carrier device; after the repair climbing robot sends a supplementation request, the material storage box is opened; the centrifugal pump in the carrier device starts to work to convey the repair material in the carrier device into the material storage box through the conveying pipe, during which, the flow meter of the carrier device and the liquid level sensor in the material storage box monitor the transportation of the repair material; when the total volume of the repair material or a liquid level in the material storage box reaches the requirement, the centrifugal pump stops working, and the material storage box is closed; and the supplementation for the repair climbing robot is completed.

The working principle of the above "primary-secondary type" disease detection and repair system is as follows:

Starting from the initial position, the system automatically moves on a road below the infrastructure, during which, the three-dimensional laser scanner and a SLAM algorithm are used to achieve its localization and map reconstruction. The line scanning camera array on the mobile robot detects a surface disease of the infrastructure, and a detected surface disease may be marked in the reconstructed map. The reconstructed map and the position of the surface disease on the map are displayed in the liquid crystal display screen of the mobile robot. After moving a distance, the mobile robot stops.

After the detection work is started, the grabbing device of the mobile robot grabs the detection climbing robot from the initial position on the mobile robot to a certain fixed point on the surface of the infrastructure. The detection climbing robot starts from the fixed point and detects an internal disease of the infrastructure by using a pheromone-based path planning method. The detection climbing robot and the mobile robot are kept in communication with each other in a wireless manner. The mobile robot can acquire the position of the climbing robot on the reconstructed map in real time, and display the position in the liquid crystal display screen. In the detection process, the detection climbing robot continuously transmits data collected by the radar back to the control processing module of the mobile robot. When the control processing module determines that the data are disease data, the mobile robot may mark a position trajectory corresponding to the data on the reconstructed map, and use a deep learning program to inverse the disease data into a disease model. The liquid crystal display screen of the mobile robot may display an internal disease mark and the corresponding inversed disease model. After all areas on the reconstructed map have been detected, the detection climbing robot returns to a certain fixed point on the surface of the infrastructure, and the grabbing device of the mobile robot grabs the detection climbing robot from the fixed point to the initial point on the mobile robot.

After the repair work is started, the grabbing device of the mobile robot grabs the repair climbing robot from the initial position on the mobile robot to a certain fixed point on the surface of the infrastructure, and the repair climbing robot goes to a target surface disease position according to a D*Lite path planning algorithm to do the repair work. The repair climbing robot and the mobile robot are kept in communication with each other in a wireless manner. The mobile robot can acquire the position of the repair climbing robot in the reconstructed map in real time, and display the position in the liquid crystal display screen. When the repair climbing robot reaches a surface disease point, the repair climbing robot will accurately repair the disease by means of structural light scanning+3D fluid printing. After the repair is completed, the liquid crystal display screen of the mobile robot may mark the repaired disease in a different color in the reconstructed map. After one disease has been repaired, the repair climbing robot continues to go to a next disease position for repairing. After all the surface disease points on the map have been repaired, the repair climbing robot returns to a certain fixed point on the surface of the infrastructure, and the grabbing device of the mobile robot grabs the repair climbing robot from the fixed point to the initial point on the mobile robot. After the detection work and the repair work of one area have been completed, the mobile robot continues to move a distance and stops, and starts to do the detection and repair work for the next area.

The climbing robots are connected to the power supply device of the mobile robot, so that the mobile robot can supply power to the climbing robots in real time.

The repair climbing robot can detect its remaining of the repair material. In case of a shortage of the repair material, the repair climbing robot will return to a certain fixed point on the surface of the infrastructure, and the grabbing device of the mobile robot grabs it to the initial point on the mobile robot for supplementation.

Embodiment 2

A detection and repair method based on the disease detection and repair system for an infrastructure of Embodiment I is applied to the control processing module of the mobile robot, and includes:

In stage I: the mobile robot detects a surface disease of an infrastructure.

In step 1: three-dimensional point cloud data of a surrounding environment collected by the three-dimensional laser scanner are acquired to construct a global map.

Specifically, three-dimensional point cloud data of a surrounding environment collected by the three-dimensional laser scanner are acquired, and the three-dimensional point cloud data of the surrounding environment is generated. A first point cloud is used as a reference point cloud, and a pose change of the mobile robot can be obtained via an ICP registration algorithm according to a subsequent point cloud sequence; a local map is constructed according to the pose change; and in the moving process of the mobile robot, the current local map is added into an originally constructed map, so that the global map is continuously updated.

In step 2: surface image data collected by the line scanning camera array are acquired to detect a surface disease structure, and detected surface disease structure information is located in the global map.

Specifically, a plurality of pairs of binocular images are acquired by binocular cameras formed by every two units in the line scanning camera array; and the surface of the large infrastructure is quickly scanned, so that the surface disease structure information can be quickly detected and is then located on the constructed map.

In stage II: the detection climbing robot is controlled to detect an internal disease of the infrastructure.

In step 3: the grabbing device is controlled to grab the detection climbing robot and place the same on the surface of the infrastructure; laser radar data transmitted by the detection climbing robot is received; path planning is performed by using the pheromone-based path planning method; and the detection climbing robot is controlled to detect an internal disease according to the path.

In step 4: internal disease information detected by the detection climbing robot and the corresponding detection path are received; and inversion is performed by using a deep learning model according to the corresponding laser radar data, thus obtaining a corresponding disease model and marking the corresponding disease model on the global map.

In step 5: after the detection of the internal disease is completed, the detection climbing robot is controlled to return, and the grabbing device is controlled to grab the detection climbing robot and place the same back onto the mobile robot.

In the step 3, the path planning performed by using the pheromone-based path planning method includes:

(1) Front surface image data acquired by the detection climbing robot through the camera platform are acquired, and a local raster map of the surrounding environment of a current position of the climbing robot is constructed.

Specifically, front surface image data acquired by the binocular camera and the depth camera are received; and the data acquired by the two cameras are fused, and a pose change of the climbing robot is calculated, so that a raster map of the surrounding environment of the climbing robot is constructed more accurately.

(2) All raster points in the local raster map are initialized to be the same pheromone values.

(3) Laser radar data transmitted by the detection climbing robot are acquired; the current raster point where the detection climbing robot is located is detected for an internal disease; the pheromone value in the local raster map is corrected according to a detection result; the pheromone values of the raster points around the raster point with a disease are increased, and the pheromone value of the current raster point is decreased; one raster point with the pheromone value greater than or equal to that of the current raster point is selected from the raster points around the current raster point as a next raster point. Specifically:

(a) Whether the current raster point of the climbing robot has a disease is detected; if no, a roulette method is adopted to select a certain raster point around the current raster point as a next raster point, and the pheromone value of the current raster point is decreased; if yes, the pheromone values of the raster points around the current raster point are increased; one raster point with the pheromone value greater than that of the current raster point is selected from the surrounding raster points as a next raster point; and the pheromone value of the current raster point is decreased.

(b) The climbing robot is controlled to move to the next raster point, and the step (a) is repeated.

The pheromone-based path planning method is adopted. Since the climbing robot can only move on the raster points and tend to take the raster point with a large pheromone value as a next position, when the pheromone values of the surrounding raster points are equal, a next raster point is selected by means of roulette. The pheromone value of the raster point that the climbing robot has passed through will be decreased, so that the probability that the climbing robot passes through this point again is reduced. When an internal disease is detected on a certain raster point, the climbing robot sends path information from the previous raster point to the current raster point to the mobile robot. The mobile robot marks its position path on the constructed global map and records a disease model displayed on the liquid crystal display screen. At the same time, the pheromone values of the raster points around this raster point are increased, so that the climbing robot will tend to move towards the raster point on which a disease is detected. Thus, complete disease information will not be missing. Each pheromone value will be updated once every movement of the mobile robot.

In stage III: the repair climbing robot is controlled to repair the disease.

In step 3: the grabbing device is controlled to grab the repair climbing robot and place the same on the surface of the infrastructure.

In step 4: a repair path is planned on the basis of a D*Lite path planning algorithm according to the position of the disease, and the repair climbing robot is controlled to repair the disease according to the path.

In step 5: after the repair of the disease is completed, the repair climbing robot is controlled to return, and the grabbing device is controlled to grab the repair climbing robot and place the same back onto the mobile robot.

In the repair process, if a supplementation request of the repair climbing robot is received, the step 5 is executed; and after the supplementation is completed, the step 3 is executed, and the repair work is continued.

The above one or more embodiments have the following technical effects:

A "primary-secondary type" disease detection and repair system for an infrastructure based on climbing robots and a mobile robot is provided. The mobile robot, the detection climbing robot and the repair climbing robot are used to cooperate with each other to complete the detection and repair work for diseases. The mobile robot reconstructs a map, provides power and repair materials to the climbing robots, detects surface diseases of the infrastructure and displays disease information. The detection climbing robot adopts the pheromone-based path planning method to detect internal diseases of the infrastructure. The repair climbing robot uses structural light scanning and 3D fluid printing to achieve accurate repair. All the parts share out the work and cooperate with one another, so that the entire detection and repair process is completed more quickly and accurately.

The mobile robot uses the line scanning camera array to recognize the surface diseases of the infrastructure and locate the surface diseases on the reconstructed map, so that the quickness and the accuracy are improved.

The positions of the climbing robots, the reconstructed map, the detected and repaired states of the diseases and the disease inversion model can be observed in real time through the liquid crystal display screen, so that it is more convenient for observation.

The detection climbing robot detects the internal disease by using the pheromone-based path planning method, so that the detection is faster and will not miss any part.

The repair climbing robot repairs the disease on the basis of structural light scanning+3D fluid printing, so that the quickness and accuracy of the repair work are improved.

The mobile robot provides power and repair materials to the climbing robots, and the supplementation process can be automatically completed, so that the continuation capability and automation level of the system are improved.

The system has high flexibility and can perform repair work without affecting the use of the large infrastructure.

The foregoing descriptions are merely preferred embodiments of the present invention, but are not intended to limit the present invention. A person skilled in the art may make various alterations and variations to the present invention. Any modification, equivalent replacement, or improvement made within the spirit and principle of the present invention shall fall within the protection scope of the present invention.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A primary-secondary type disease detection and repair system for an infrastructure, wherein comprising a mobile robot, wherein two climbing robot fixing devices are arranged on the mobile robot; and the two climbing robot fixing devices are respectively used to place a detection climbing robot and a repair climbing robot; and the mobile robot is configured to detect a surface disease of the infrastructure, control the detection climbing robot to detect an internal disease of the infrastructure, and record positions of the surface disease and the internal disease; and after the detection is completed, control the repair climbing robot to perform repair according to positions of diseases.

2. The primary-secondary type disease detection and repair system for the infrastructure according to claim 1, wherein the mobile robot comprises a control processing module, a three-dimensional laser scanner, a line scanning camera array, a display screen and a grabbing device; and the three-dimensional laser scanner, the line scanning camera array, the grabbing device, the display screen, and control modules of the detection climbing robot and the repair climbing robot are all in communication connection with the control processing module.

3. The primary-secondary type disease detection and repair system for the infrastructure according to claim 1, wherein the mobile robot comprises a power supply device which is connected to cable interfaces on the detection climbing robot and the repair climbing robot through cables.

4. The primary-secondary type disease detection and repair system for the infrastructure according to claim 1, wherein the mobile robot comprises a carrier device; the carrier device comprises a conveying pipe and a centrifugal pump; the centrifugal pump is connected to a control processing module; and when the repair climbing robot is at a corresponding fixed position, the conveying pipe is abutted with a material storage box on the repair climbing robot.

5. The primary-secondary type disease detection and repair system for the infrastructure according to claim 1, wherein a cable interface and a control module are arranged on a climbing robot main body, and a camera platform, a mechanical arm and a detection equipment which are connected to the control module are also arranged on the climbing robot main body; a tail end of the mechanical arm is connected to the detection equipment through a carrying platform; and the detection equipment is a laser radar.

6. The primary-secondary type disease detection and repair system for the infrastructure according to claim 1, wherein a cable interface, a material storage box and a control module are arranged on a repair climbing robot main body, and a mechanical arm, a structural light module and a fluid printing module which are connected to the control module are also arranged on the repair climbing robot main body; a tail end of the mechanical arm is connected to the fluid printing module; and disease repair work is done by combining structural light scanning with 3D fluid printing.

7. The primary-secondary type disease detection and repair system for the infrastructure according to claim 6, wherein a switch for controlling opening and closing and a liquid level sensor are also arranged in the material storage box and are both connected to the control module.

8. A detection and repair method based on the primary-secondary type disease detection and repair system for the infrastructure according to claim 1, comprising:
  (1) detecting, by the mobile robot, the surface disease of the infrastructure:
  acquiring three-dimensional point cloud data of a surrounding environment collected by a three-dimensional laser scanner to construct a global map; and
  acquiring surface image data collected by a line scanning camera array to detect a surface disease structure, and locating detected surface disease structure information in the global map;
  (2) controlling the detection climbing robot to detect the internal disease of the infrastructure:
  controlling a grabbing device to grab the detection climbing robot and place the same on a surface of the infrastructure;
  receiving laser radar data transmitted by the detection climbing robot, planning a path by using a pheromone-based path planning method, controlling the detection climbing robot to detect the internal disease according to the path, and locating the detected surface disease structure information in the global map; and
  after the detection of the internal disease is completed, controlling the detection climbing robot to return, and controlling the grabbing device to grab the detection climbing robot and place the same back onto the mobile robot; and
  (3) controlling the repair climbing robot to repair the disease:
  controlling the grabbing device to grab the repair climbing robot and place the same on the surface of the infrastructure;
  planning a repair path on a basis of a D*Lite path planning algorithm according to the position of the disease, and controlling the repair climbing robot to repair the disease according to the path; and
  after the repair of the disease is completed, controlling the repair climbing robot to return, and controlling the grabbing device to grab the repair climbing robot and place the same back onto the mobile robot.

9. The detection and repair method according to claim 8, wherein the planning a path by using the pheromone-based path planning method, comprises:
  acquiring front surface image data acquired by the detection climbing robot through a camera platform, and constructing a local raster map of a surrounding environment of a current position of a climbing robot;
  initializing all raster points in the local raster map to be the same pheromone values; and
  acquiring the laser radar data transmitted by the detection climbing robot; detecting a current raster point where the detection climbing robot is located for the internal disease; correcting a pheromone value in the local raster map according to a detection result; increasing pheromone values of the raster points around the raster point with the disease, and decreasing a pheromone value of the current raster point; and selecting one raster point with the pheromone value greater than or equal to that of the current raster point from the raster points around the current raster point as a next raster point.

10. The detection and repair method according to claim 8, characterized in that, wherein in a repair process of the repair climbing robot, if a supplementation request of the repair climbing robot is received, the repair climbing robot is controlled to return, and the grabbing device is controlled to grab the repair climbing robot and place the same back onto the mobile robot; and after a supplementation is completed, the grabbing device is controlled to grab the repair climbing robot and place the same on the surface of the infrastructure to continue a repair work.

* * * * *